United States Patent Office 3,534,120
Patented Oct. 13, 1970

3,534,120
COPOLYESTER FILAMENTS CONTAINING MINOR AMOUNT OF POLYOLEFINS
Satoshi Ando, Osaka-shi, and Tetsuo Kinoshita and Takashi Ito, Hyogo-ken, Japan, assignors to Kanegafuchi Boseki Kabushiki Kaisha, Tokyo, Japan, a corporation of Japan
No Drawing. Filed May 4, 1967, Ser. No. 636,021
Claims priority, application Japan, May 11, 1966, 41/30,148
Int. Cl. C08g 39/10
U.S. Cl. 260—873  12 Claims

ABSTRACT OF THE DISCLOSURE

In conducting melt-extrusion of a material comprising at least one copolyester into a shaped article such as a filament or a film, said article, will have markedly reduced stickiness if a polyolefin is uniformly admixed in said copolyester before said extrusion.

Filaments and films having reduced stickiness lead to improved dyeability, antipilling property and heat-shrinkability of the shaped articles.

BACKGROUND OF THE INVENTION

Field of the invention

The present invention relates to an improved shaped article comprising at least one copolyester and a method of manuafcturing same.

Description of the prior art

Polyester fibers in particular have been in large demand because of their superior properties. Most of these conventional polyester fibers have consisted of homopolymers. In view of the fact, however, that homopolyester fibers are deficient in their dyeability and antipilling property, various proposals have been made to improve such deficiences by the provision of various kinds of copolyesters in which a specific polyester-constituting third component, different from those components constituting said homopolyesters, is copolymerized together with said latter components of the homopolyesters. Several kinds of these copolyesters have been already manufactured on an industrial basis. Fibers consisting of these copolyesters in general not only were superior in dyeability and antipilling properties as compared with fibers consisting of homopolyesters but also had an increased heat-shrinkability and, therefore they were utilized for special purposes. However, as is seen in industrially manufactured copolyester fibers, one of the reasons for the necessity of copolymerizing said specific third component only at a relatively low copolymerizing monomer ratio may be explained by the fact that the fibers and films made therefrom developed increased degrees of sticking with an increase in the copolymerizing monomer ratio of said third component, and this has constituted a serious obstacle in a sound operation.

More specifically, in case a copolyester which has been melt-spun in the form of either a filament or a film is wound around a bobbin after an oiling treatment with, for example, an aqueous emulsion, there occurs a phenomenon that the resulting filaments stick to each other. As a result, when the filaments wound around a bobbin are unwound at the time of transferring the filament to a subsequent step such as drawing, there occurs a disparity in the tension of the filaments, resulting in not only the lack of uniform treatment of the filaments, but also, to cite an extreme case, in the breakage of the filaments and, furthermore, there will occur a marked degree of adhesion between the filaments, causing impairment of the operation of unwinding the filaments from the bobbin and resulting in a marked reduction in the efficiency of the operation. Moreover, the resulting filament will completely lose its utility value as a filament. A similar sticking phenomenon can occur in copolyester films.

Furthermore, in the manufacture of a side-by-side type composite filament composed of two or more different polymers which are highly eccentrically arranged in a cross section of a single filament and which have a latent crimpability, it is necessary to use polymers which are similar to each other in their chemical properties and also in their chemical structures to avoid spontaneous separation of the respective component polymers from each other which may develop after being spun into a single filament. To this end, it is generally desirous to combine a copolyester with a homopolyester. In order to obtain an increased latent crimpability of such a composite filament by the introduction of as great a disparity as possible in the crystal structure and the shrinkability between these two component polymers, it is advantageous to increase the copolymerizing monomer ratio of said third component contained in said copolyester. However, since an increase in the monomer ratio of the third component contained in the copolyester will result in a marked increase in the sticking property of the resulting shaped article, there should naturally be a considerable restriction to be imposed on the selection of the copolymerizing monomer ratio of the third component to be contained in the copolyester and also on the selection of the material to be copolymerized. For this reason, it has been difficult to manufacture side-by-side type polyester composite filaments having a satisfactory crimpability and especially having a good crimp retention.

After an extensive research with an aim to solve the foregoing problems, the present invention has been made

SUMMARY OF THE INVENTION

It is an object of the present invention to provide a filament, a film or like shaped article consisting entirely or partly of at least one copolyester and having no sticking property, without spoiling other superior properties of such shaped article, and also to provide a method for manufacturing such shaped article.

Another object of the present invention is to provide a filament, a film or like shaped article, which is applicable to practical use from a polyester having a large copolymerizing monomer ratio of the third component that it would fail to produce, if it were used without the present invention, a filament, a film or like shaped article which could be applied to practical use, because of the stickness of such an article, and also to provide a method for manufacturing such shaped article.

Still another object of the present invention is to provide a composite polyester filament exhibiting no appreciable stickiness and having an extremely superior crimpability and especially crimp retention, by performing conjugate spinning of a copolyester and a homopolyester or a copolyester having different properties and containing a third component of a relatively low monomer ratio.

The foregoing objects are attained by uniformly mixing, prior to subjecting said copolyester to a melt-extrusion process to form a filament, a film or like shaped article, a polyolefin in said copolyester in such a manner that said polyolefin is uniformly distributed in the aforesaid copolyester.

Copolyesters which can be applied to the method of the present invention are represented by the copolymers of at least two polyesters selected from the group consisting of polyesters obtained from diols, dicarboxylic acids or the lower alkylesters of said dicarboxylic acids and polyesters obtained from oxycarboxylic acids or their lower alkylesters. Such copolyesters are obtained by subjecting said diols and said dicarboxylic acids or their lower alkylesters as a pair of components and said oxycarboxylic acids or their lower alkylesters as another component to condensation-polymerization or by copolymerizing the polymers, namely the homopolyesters and/or copolyesters obtained from these substances. This latter method of copolymerization effected by blending polymers is hereinafter referred to as the "blending method." Diols are represented by arbitrary hydroxy compounds which are expressed by the general formula of HOROH and which have 2 to 18, preferably 2 to 10 carbon atoms, wherein R can include aliphatic radicals, aromatic radicals, oxy radicals, arylene dioxy radicals, thio radicals or sulfonyl radicals. Diols include, for example, ethylene glycol, tetramethylene glycol, hexamethylene glycol, decamethylene glycol, 2,2-dimethyl-1,3-propanediol, cis-form or trans-form p-hexahydroxyxylene glycol, diethylene glycol, bis-(4-hydroxybutyl) ether, bis-p - (β-hydroxyethoxy) benzene, triethylene glycol, 4,4' - bis-(β - hydroxyethyl) biphenyl, and tetraethylene glycol. Also, polyalkylene glycols, such as polyethylene glycol of high molecular weight may be used. Dicarboxylic acids are represented by arbitrary dicarboxylic compounds which are expressed by the general formula of HOOCR'COOH and which have 2 to 20, preferably 2 to 15 carbon atoms, wherein R' can include aliphatic radicals, aromatic radicals, oxy radicals, thio radicals, sulfonyl radicals and arylene dioxy radicals. Dicarboxylic acids include, for example, glutaric acid, adipic acid, pimelic acid, sebacic acid, decanedicarboxylic acid, tetradecanedicarboxylic acid, trans-form or cis - form hexahydrophthalic acid, hexahydroisophthalic acid, hexahydroterephthalic acid, terephthalic acid, isophthalic acid, phthalic acid, p-carboxyphenyl acetic acid, p-phenylenediacetic acid, dibenzoic acid, diphenoxyethane - 4,4' - dicarboxylic acid, diphenoxybutane - 4,4' - dicarboxylic acid, p,p'-carbonyl dibenzoic acid, diphenylether-4,4'-dicarboxylic acid, thiophenylether - 4,4' - dicarboxylic acid and diphenylsulfon - 4,4' - dicarboxylic acid.

Also, dicarboxylic acids obtained by oxidizing various polyalkylene glycols having high molecular weight may be used. Oxycarboxylic acids or lactones are represented by arbitrary oxycarbonyl compounds which are expressed by the general formula of

and which have 5 to 20, preferably 5 to 15 carbon atoms, wherein R" can include aliphatic radicals, aromatic radicals, oxy radicals or arylenedioxy radicals. Oxycarboxylic acids or lactones include, for example, p-oxymethyl benzoic acid, p-(β-oxyethyl)-benzoic acid, p-(β-oxyethoxy)-benzoic acid, p-(γ-oxypropoxy)-benzoic acid, p-(β-oxyethoxy)-phenyl acetic acid, p-(β-oxyethoxy)-m-methoxybenzoic acid, p-(γ-oxypropoxy)-m-methoxy-benzoic acid, δ-valerolactone, ε-caprolactone, ω-oxynonanoic acid and ω-oxydeconoic acid. Also, oxycarboxylic acids obtained by the partial oxidation of various polyalkylene glycols having a high molecular weight may be used. The dicarboxylic acids and the oxycarboxylic acids enumerated above are used directly or in a simple alkylester form such as methylester or ethylester.

The diols, dicarboxylic acids and oxycarboxylic acids enumerated above having substituted radicals such as: alkyl radicals including methyl radicals and ethyl radicals; alkoxy radicals such as methoxy and ethoxy radicals and halogen radicals including chlorine can be used also.

Most preferably, the diol is selected from the group consisting of ethylene glycol, triethylene glycol, polyethylene glycol and decanediol; while dicarboxylic acids and their lower grade alkylesters are selected from the group consisting of terephthalic acid, isophthalic acid, adipic acid, diphenoxyethane-4,4'-dicarboxylic acid, 1,10-decanedicarboxylic acid and their lower alkylesters; and oxycarboxylic acids or their lower alkylesters consist of p-(β-oxyethoxy) benzoic acid or its lower alkylesters.

It is to be understood that the copolyesters obtained by copolymerizing two or more of the polyester-constituting monomers enumerated above or by copolymerizing two or more of the polymers obtained from these monomers after blending said polymers include those denatured with a small amount of a diol or a dicarboxylic acid both having polar radicals such as sulfonic acid radicals, phosphoric acid radicals and amino radicals which contribute to an improved dyeability of the shaped articles. Said copolyesters may contain, as required, an inorganic or organic substance such as a flattening agent, a pigment, a dye, an antilight agent, an antiheat agent, an antistatic and a plasticizing agent.

The present invention is useful not only where the polymer constituting the filament or the film consists of a single copolyester, but also where the polymer is a mixture of said copolyester and a polyester different therefrom, of a homopolyester, or a copolyester of other kind. The present invention is useful also where the filament is a composite filament such as is comprised of a copolyester and a polyester different therefrom, namely, this latter polyester being a homopolyester or a copolyester of another kind, which are conjugated in side-by-side relationship extending along the axis of said filament. In all of these instances, said homopolyester consists, most usually, of polyethylene terephthalate.

The relationship between the copolymerizing monomer ratio of the third component and the occurrence of the sticking phenomenon which is closely associated with the feasibility of the unwinding of filaments or films, comprising at least one of said copolyesters varies with factors such as the type of the predominant polyester-constituting monomers, the polyester-constituting monomers to be copolymerized with said predominant monomers, the degree of branching of the molecular chains of these monomers, the asymmetrical pattern of these molecular chains, the presence or absence of polar radicals, the conditions of oiling treatment, the take-up conditions, the temperature and the humidity during the spinning process, and therefore, it is difficult to specify said relationship with general terms. It has been clarified from a number of experiments undertaken by the inventors, however, that the amount of the phenylene radicals contained in the main molecular chains of the polyesters and the secondary transition points of the polyesters constitute important factors of said relationship. Specifically, it has been found that when the proportion of the total phenylene radicals contained in the main molecular chains of the polyesters is in the level of about 36% or less by weight of the total weight of the polyesters, there easily occurs the aforesaid sticking. The present invention is effective when applied particularly to such copolyesters as having phenylene radicals in an amount equal to or less than the aforesaid maximum limit.

The polyolefins used in the method of the present invention are represented by polymers, copolymers, their mixtures and their oxidized products obtained from any one or the mixture of two or more of the following monomers, namely, α-olefins such as ethylene, propylene, isobutylene, 1-butene, 3-methyl-1-butene, 1-pentene and 4-methyl-1-pentene; and occasionally butadiene. Also, the aforesaid polyolefins include denatured polymers or their mixtures obtained from the copolymerization of the above enumerated monomers and the vinyl monomers other than said monomers, for example, ethyl acrylate, methyl methacrylate, diethyl maleate, vinyl butyl ether, vinyl acetate and styrene, the proportion of said vinyl monomers being up to about 30% by weight of the total weight of said monomers and said vinyl monomers. It is needless to say that paraffin which is regarded as a low-grade polymer of polyolefin can also be used effectively. These polymers can be used either independently or in the form of a mixture of two or more of them.

Such polyolefin as have been referred to above is admixed, in the form of either powder, fine granules or fine chips, to the copolyester-constituting monomers before the latter are subjected to condensation polymerization, or alternatively, said polyolefin may be admixed to said monomers either during condensation polymerization or to the resulting polymers after the completion of condensation polymerization, and the resulting product is stirred well to insure that said polyolefin is uniformly dispersed in the obtained copolyester. Copolyesters containing a uniformly dispersed polyolefin are melt-extruded by a known method either directly or after they are shaped into fine granules or fine chips. A satisfactory result is obtained also by melt-extruding fine chips or granules of a copolyester not containing a polyolefin after admixing thereto fine chips or powder of a polyolefin in such manner that the extruded filament or film may contain said polyolefin uniformly dispersed therein. In any way, it is important to note that the polyolefin which is mingled with a copolyester while the latter is in the molten state is made to be contained therein in a uniformly dispersed state by a mechanical operation such as mixing by stirring. The effect of stirring may be obtained also by the use of a screw housed in a melt-extruder or by any other appropriate means.

The appropriate amount of the polyolefin to be admixed with a copolyester, in order to attain the objects of the present invention, is in the range between 0.01% and 25% by weight of the total weight of the copolyester. A satisfactory result is obtained in case this range is between 0.1% and 15% by weight. When the content of the polyolefin is less than 0.01% by weight, no desired antisticking effect can be obtained. In case the content exceeds 25% by weight, on the other hand, the inherent properties of the copolyester is modified or altered, resulting in an undesirable loss in the physical properties which are necessary for the filament or the film from the viewpoint of their utility.

The amount of the polyolefin to be admixed in the copolyester can be selected appropriately within the aforesaid range. However, as has been discussed previously, copolyesters in general develop an increased degree of sticking with a reduction in the amount of phenylene radicals in the main molecular chains of said copolyesters and therefore, it is preferred that the amount of the admixed polyolefin be controlled in accordance with the structures of the components of the copolyesters and also with the monomer ratio of the third component contained in the copolyesters.

By the addition of a polyolefin to copolyesters according to the present invention, not only the copolyesters completely lose or markedly reduce their sticking property and thus provide a number of advantages in the performance of the operation, but also it is bestowed with an enhanced heat-shrinkability which is an important property of copolyesters. This enhanced shrinkability to heat, together with the feasibility of increasing the monomer ratio in the copolymerization, leads to a further enhancement of the heat-shrinkability of the copolyesters, and also, a polyester filament or film having no sticking property can be easily obtained. As a result, there will be developed new fields of utility for the copolyesters of which no utility value has been recognized in the past. It is to be noted that, by the use of polyolefin within the aforesaid range of its content, there occurs no substantial reduction in the tensile strength, elongability, dyeability, hygroscopicity, elastic recovery and other desirable properties of the copolyesters. Furthermore, a composite filament obtained by simultaneously spinning, through the same spinneret orifice, two separately melted components, one of which consists of a copolyester containing a polyolefin according to the method of the present invention and the other consisting of a known homopolyester or a copolyester different in either viscosity, copolymeric components or copolymerizing monomer ratio, from the copolyester containing a polyolefin, shows a good mutual conjugation and bonding of these two polymers but exhibits no sticking property, and bears an increased latent crimpability due to its high degree of heat-shrinkability, and can be further processed by a heat-treatment into a fiber having extremely improved crimpability and bulkiness.

Thus, the melt-spun filament comprising at least one copolyester according to the present invention has advantages that it can be uniformly and easily treated in a series of processes after the spinning, including an oiling process, a take-up process and a drawing process, and further in the subsequent processing including knitting and weaving, without the accompaniment of troubles due to poor unwinding of the filament from the bobbin or due to the sticking between the filaments just as an ordinary homopolyester filament has no such troubles. Not only that, according to the present invention, there is provided a copolyester fiber having the foregoing superior properties which have never been possible with the conventional homopolyester filaments and having such an improved, high utility value as has not been expected of conventional copolyesters. Therefore, the copolyester fibers of the present invention can be used either independently or in combination with other kinds of fibers for being utilized in new fields as the starting material for the manufacture of various clothings, interior decorations and industrial tools and appliances. Above all, interesting fibers and fabrics of modified types may be produced by utilizing the improved, high heat-shrinkability and high elongability of the copolyester fiber of the present invention by subjecting this fiber to a heat-treatment after the latter has been subjected to mixed spinning with a fiber of other kind, or after the copolyester fiber of the present invention has been woven with a fiber of other kind. Also, the copolyester of the present invention can be used in the production of a nonwoven fabric and film. Thus, the copolyester of the present invention can be utilized in various unique fields which could never be possible with ordinary copolyesters of the prior art.

Description of the present invention will be hereunder made in further detail in connection with examples and control examples. It is to be understood that the term "parts" appearing in the following description of examples all means "parts by weight."

EXAMPLE I

Various copolyesters in this example are produced by the following method.

Specifically, the following materials, namely, 1 mol. of dimethylester of dicarboxylic acids, 3 mol. of diols, and zinc acetate in an amount of 0.02% by weight to the total weight, were mixed together for reaction at 190° C. for four hours. After distilling out methanol therefrom, the resulting mixture was added with antimony trioxide in an amount of 0.02% to the total weight. By raising the temperature, excess diols having low boiling points were distilled out (excess diols were in general represented by ethylene glycol, and the temperature was 230° C.). Thereafter, the temperature was raised further to a level in the range between 250° C. and 300° C. while reducing the pressure, to perform polymerization for five hours. Thus, copolyesters were produced. Also, copolyesters based on the blending method were produced in the following manner. Specifically, two kinds each of homopolyesters and copolyesters were first produced in a manner identical to that described above. These two groups of homopolyesters and two groups of copolyesters were melted and mixed together at a temperature ranging from 250° C. to 300° C. for two hours to produce copolyesters. Alternatively, they were mixed by means of an extruder, and the mixture was cut into chips. These chips were melted and mixed mechanically at a temperature between 250° C. and 300° C. for two hours while being stirred to produce copolyesters. The conditions of the manufacture of copolyesters from oxycarboxylic acids were identical to those described above. In this latter instance, however, a diol in a mol three times as large as the commonly practiced amount of dicarboxylic acid was used. In these methods of producing copolyesters, a polyolefin was admixed thereto either at the time antimony trioxide was added or at the time the copolyesters based on the blending method were manufactured. In case the polyolefin was added to the produced copolyesters, a predetermined amount of polyolefin was admixed thereto in a manner exactly the same with that applied to the manufacture of the copolyesters based on the blending method. All of these operations were conducted in a dry nitrogen gas.

The resulting copolyesters were subjected to melt-spinning in accordance with a known method. Thereafter, the resulting filaments were subjected to an oiling treatment utilizing an aqueous emulsion. The treated filaments were taken up on bobbins as undrawn filaments of 70 denier, and the resulting wound filaments were used as the specimens for testing.

The degree of sticking of the obtained filaments was determined by the following measuring method. Specifically, the bobbins were erected upright. A tension meter (manufactured by Toyo Sokki Co., Ltd., Type: TI-80) was disposed at a position 90 cm. right above the bobbin and on the extension of the axis of each the bobbins. A guiding member was fixed at a point 12 cm. obliquely downward relative to the tension meter, the line drawn between said point and the tension meter together with the axis of the bobbin forming an angle of 20 degrees. Furthermore, a beam was installed at a position horizontally of the guiding member. In this arrangement, the filament unwound from the bobbin was passed through its mating tension meter and then through the guiding member, and was then taken up by the beam. The resistance of the filment sensed by the tension meter was recorded on a chart provided in a recorder utilizing a pen (manufactured by Watanabe Sokki Seisakusho, Type WTR-211). The measurement was performed under the conditions represented by a take-up speed of 100 m. per minute. The graduations of 1 cm. provided on the chart on which the resistance of the unwound filament was recorded was adjusted so as to correspond to the resistance under loading in the range between 5 gr. and 15 gr.

The compositions of the copolyesters and the result of the measurement of the degree of sticking of the filaments are shown in Table I.

EXAMPLE 2

One hundred parts of dimethyl terephthalate, 80 parts of ethylene glycol and 0.92 part of zinc acetate were reacted with each other at 190° C. for four hours. After methanol was distilled out, 0.02 part of antimony trioxide was added. Excess ethylene glycol was distilled out by elevating the temperature to 230° C. Thereafter, the remaining mixture was subjected to polymerization by raising the temperature under a reduced pressure and holding the temperature at 280° C. and under a reduced pressure of 1 mm./Hg for five hours. As a result, polyethylene terephthalate (Polymer A) was manufactured. Also, in a manner exactly identical to the above excepting for the use of 34.4 parts and 16 parts of polyethylene glycol having a molecular weight of 600, respectively, two different copolyesters (Polymer B and Polymer C) were obtained. The amount of polyethylene glycol in Polymer B and Polymer C was found, by calculation, to be 26.5% by weight and 14.1% by weight, respectively, to the total weight of the copolyesters. By admixing an additive (B), in an amount of 1% by weight, to Polymer B and to Polymer C, respectively, in a manner as outlined in Example 1, and as a result, Polymer B' and Polymer C' were obtained.

By using these five different types of polymers thus obtained, that is to say, by using Polymer A as one component, and Polymer B, Polymer B', Polymer C and Polymer C' as the other components, respectively, they were melted separately in a melt-spinning apparatus designed for the manufacture of composite filaments, and each pair was extruded through the same spinneret orifice, with the result that undrawn side-by-side type single filaments (conjugation ratio 1:1) of 70 denier were obtained. After applying an oiling agent for spinning consisting of an aqueous emulsion to the said filaments, the latter were wound around bobbins, and thus, four types of filaments were obtained. The resulting filaments are designated as Filament B, Filament B', Filament C and Filament C', respectively.

The degrees of sticking of these four types of filaments were measured in a manner as is described in Example 1. The result was that Filament B exhibited such a marked degree of sticking that it was impossible to unwind it from the bobbin; Filament B' did not exhibit any sticking and showed a low unwinding resistance of the order ranging from 15 to 20 gr., with a result that it was possible to draw the filament to 5.0 times the original length without any trouble; and Filament C showed an unwinding resistance in the range between 4.0 and 5.5 gr. while

TABLE I

| No.[1] | Principal components | Copolymerized component [2] | Additive [3] | Degree of sticking |
|---|---|---|---|---|
| 1 | Dimethyl terephthalate / Ethylene glycol | Diethyl adipate | Nil | Marked sticking; unable to take up. |
| | do | do | (A) 0.5% | 2.0 to 2.5 gr. |
| 2 | Dimethyl terephthalate / Ethylene glycol | Polyethylene glycol (M.W. 1,500) 20% by weight | Nil | Marked sticking; unable to take up. |
| | do | do | (B) 2.0% | 1.5 to 2.0 gr. |
| 3 | Dimethyl terephthalate / Ethylene glycol | Dimethyl isophthalate, 10% Diethyl adipate, 20% | Nil | 3.0 to 4.5 gr. |
| | do | do | (C) 10%[5] | 1.0 to 1.5 gr. |
| 4 | Diphenoxyethane 4,4'-dimethyl dicarboxylate. / Ethylene glycol | Decanediol, 20% | Nil | 2.0 to 3.0 gr. |
| | do | do | (B) 2.0% | 1.0 to 1.5 gr. |
| 5 | Methyl-p-(β-oxyethoxy) benzoate. | Dimethyl-1,10-decane-dicarboxylate, 15% | Nil | Marked sticking; unable to take up. |
| | | Triethylene glycol, 15% | | |
| | Methyl-p-(β-oxyethoxy) benzoate. | do | (D) 1.0% | 1.5 to 2.5 gr. |

[1] The entry on the upper side of the horizontal column bearing the same serial number represents a control (without polyolefin).
[2] The numerical figures represent the mol ratio against the dicarboxylic acid or diol which constitutes the principal component. Weight percent represents the value against the total weight of the copolyesters.
[3] Where the admixing manner is not mentioned, it is to be understood that the admixture was conducted at the time of polymerization. The numerical figures represent the percent by weight to the total weight. The details of the additives are as follows (this applies also to the following example):
 (A) Powder polyethylene (Type: Yukalon PS-60; a product of Mitsubishi Yuka Co., Ltd. of Japan);
 (B) Fine granule polyethylene (Type: AC-629; a product of Allied Chemical Co. of U.S.A.);
 (C) Fine powder polypropylene (Moplen; a product of Montecatini Co. of Italy);
 (D) Paraffin (having a melting point of about 70° C., a product of Wako Jun-yaku Co. of Japan).
[4] Copolymerization based on the blending method.
[5] Mixing while stirring.

Filament C' showed a small unwinding resistance of the range between 1.0 to 1.5 gr. These filaments C and C' were then drawn to 5.0 times their original lengths at 80° C. Filament C developed frequent breakage, suspending the operation quite often.

The drawn Filaments B' and C' were subjected to heat-treatment by the use of boiling water, and the resulting filaments exhibited a very superior crimpability and good crimp retention. Their crimps did not disappear after repeated tensioning of a degree close to the breaking point.

dle was fixed, while a weight of 10 mg. was suspended from the other end. This bundle was immersed in boiling water for ten minutes. At the end of the immersion, the bundle was withdrawn therefrom. The length $l$ cm. of the bundle after air-drying was measured. The shrinkage was calculated according to the following equation:

$$\text{Shrinkage in hot water}(\%) = \frac{30-l}{30} \times 100$$

TABLE 3

| | Filament | | | |
|---|---|---|---|---|
| | E | E' | G | G' |
| Degree of sticking | Marked sticking. Unwinding resistance was 3.5 to 4.5 gr. | Good unwinding resistance. Unwinding resistance was 1.0 to 1.5 gr. | Marked sticking. Unwinding resistance was 4.0 to 5.5 gr. | Good unwinding resistance. Unwinding resistance was 1.0 to 1.5 gr. |
| Drawability | Filament broke frequently when drawn. | Satisfactory drawing. Hardly any breakage of filament when drawn to five times at 80° C. | Undrawable | Satisfactory drawing. Hardly any breakage of filament when drawn to five times at 80° C. |
| Crimpability | Satisfactory | Both elastic recovery and crimp retention were excellent. | | Both elastic recovery and crimp retention were excellent. |
| Shrinkage in hot water, percent | 87.7 | 92.0 | | 92.1 |

EXAMPLE 3

In a manner described in Example 2, a copolyester was prepared by the use of 100 parts of dimethyl terephthalate, 80 parts of ethylene glycol and 30 parts of polyethylene glycol having a mean molecular weight of 6000. The resulting copolyester was extruded by an extruder, and then was cut into chips. These chips were then melt-extruded at 260° C. through a T-die of an extruder into a film form. The resulting film was wound on a roller after being cooled with water, with the result that a ribbon-form film having a thickness of 0.05 mm. and a width of 1 cm. was obtained. This film showed particularly a marked sticking at both sides, exhibiting a great deal of resistance at unwinding, and required a most careful handling. In contrast to this, a ribbon-form film prepared from a copolyester manufactured under conditions identical to that described above excepting for the admixture of an Additive (A) in an amount of 2%, showed no sticking at all, and thereafter, this latter film was drawn uniformly without any trouble.

EXAMPLE 4

In a manner as has been described in Example 2, polymers having the compositions given in the following Table 2 were manufactured.

TABLE 2

| No. | Polymer | Dicarboxylic acid component | Diol component |
|---|---|---|---|
| 1 | Polymer D | Dimethyl terephthalate, 90 parts; Dimethyl isophthalate, 10 parts | Ethylene glycol, 80 parts. |
| 2 | Polymer E | Dimethyl terephthalate, 70 parts; Dimethyl isophthalate, 10 parts; Dimethyl adipate, 20 parts | Ethylene glycol, 80 parts. |
| 3 | Polymer E' | Obtained by having Polymer E admixed with Additive (A) in an amount of 10% by weight in a manner described in Example 1. | |
| 4 | Polymer F | Polyesterether obtained from methyl p-(β-oxyethoxy)-benzoate. | |
| 5 | Polymer G | Dimethyl terephthalate, 100 parts | Ethylene glycol, 80 parts. Polycaprolactone diol (M.W.=2,000), 25 parts. |
| 6 | Polymer G' | Obtained by having Polymer G with Additive (D) in an amount of 0.5% by weight at the time of polymerization. | |

By using the foregoing six types of polymers and in a manner as described in Example 2, four kinds of undrawn composite filaments were obtained. Specifically, Filament E was manufactured from Polymer D and E; Filament E' from Polymers D and E'; Filament G from Polymers F and G and Filament G' from Polymers F and G'. Their degrees of sticking, drawability, and shrinkage in hot water are shown in Table 3.

Shrinkage in hot water was measured in the following manner. A specimen was prepared with a bundle of 40 filaments having a length of 30 cm. One end of the bun- The embodiments of the invention in which an exclusive property or privilege is claimed are defined as follows:

1. A copolyester filament having reduced stickiness and an increased degree of heat shrinkability, consisting essentially of a continuous filament of a copolyester having about 36.0 percent or less by weight of phenylene radicals in its main molecular chains, said copolyester containing admixed therein between about 0.01 percent and 25 percent by weight of a polyolefin selected from the group consisting of ethylene polymers, ethylene copolymers, oxidized ethylene polymers, and copolymers, copolymers of ethylene and other vinyl monomers in which the content of the vinyl monomer is less than 30 percent by weight, and mixtures thereof.

2. A polyester filament according to claim 1, in which said copolyester filament is continuously adhered in side-by-side conjugated relationship to a second filament component consisting essentially of a homopolyester or a second copolyester whereby to provide a conjugate polyester filament.

3. A shaped article according to claim 1, wherein the content of said polyolefin in said copolyester is in the range between 0.1 and 15% by weight of said copolyester.

4. A shaped article according to claim 1, wherein the filament consists of a mixture of a copolyester and at least one other polyester.

5. A shaped article according to claim 1, wherein said copolyester is a copolymer of at least two polyesters, one of which is selected from the group of polyesters obtained from diols and dicarboxylic acids or the lower alkylesters of said dicarboxylic acids and the other is selected from the group of polyesters obtained from hydroxycarboxylic acids or their lower alkylesters.

6. A shaped article according to claim 12, wherein said diol is selected from the group consisting of ethylene glycol, triethylene glycol, polyethylene glycol and decanediol; said dicarboxylic acid or its lower alkylester is selected from the group consisting of terephthalic acid, isophthalic acid, adipic acid, diphenoxyethane-4,4'-dicarboxylic acid, 1,10-decanedicarboxylic acid and their lower alkylesters; and said hydroxycarboxylic acid or its lower alkylester is a p-($\beta$-hydroxyethoxy)-benzoic acid or its lower alkylester respectively.

7. A method for manufacturing a copolyester filament having reduced stickiness and an increased degree of heat shrinkability, comprising mixing and uniformly distributing in (a) a copolyester having about 36.0 percent or less by weight of phenylene radicals in its main molecular chains, (b) between about 0.01 percent and 25 percent by weight of a polyolefin selected from the group consisting of ethylene polymers, ethylene copolymers, oxidized ethylene polymers and copolymers, copolymers of ethylene and other vinyl monomers in which the content of the vinyl monomer is less than 30 percent by weight, and mixtures thereof, whereby to form a filament-forming composition, and thereafter melt extruding the composition to form a filament.

8. A method according to claim 7, including the step of separately melting a second filament component selected from the group consisting of a homopolyester and a second copolyester, and then melt extruding said second filament component in side-by-side conjugated relationship with said filament-forming composition in order to form a conjugate polyester filament.

9. A method according to claim 7, wherein the content of said polyolefin in said copolyester is in the range between 0.1 and 15% by weight of said copolyester.

10. A method according to claim 7, wherein said copolyester consists of a mixture of a copolyester and at least one other polyester.

11. A method according to any one of claim 7, wherein said copolyester is a copolymer of at least two polyesters, one of which is selected from the group of polyesters obtained from diols, dicarboxylic acids or the lower alkylesters of said dicarboxylic acids and the other is selected from the group of polyesters obtained from hydroxycarboxylic acids or their lower alkylesters.

12. A method according to claim 11, wherein said diol is selected from the group consisting of ethylene glycol, triethylene glycol, polyethylene glycol and decanediol; and said dicarboxylic acid or its lower alkylester is selected from the group consisting of terephthalic acid, adipic acid, diphenoxyethane-4,4'-dicarboxylic acid, 1,10-dicarboxylic acid and their lower alkylesters; and said hydroxycarboxylic acid or its lower alkylester is a p-($\beta$-hydroxyethoxy)-benzoic acid or its lower alkylester respectively.

References Cited

UNITED STATES PATENTS

| 3,207,816 | 9/1965 | Dugliss | 260—873 |
| 3,361,848 | 1/1968 | Siggel | 260—873 |
| 3,397,169 | 8/1968 | Wilkinson | 260—873 |
| 3,405,198 | 10/1968 | Rein | 260—873 |

FOREIGN PATENTS

| 713,638 | 7/1965 | Canada. |
| 1,282,373 | 12/1961 | France. |
| 1,283,536 | 12/1961 | France. |

PAUL LIEBERMAN, Primary Examiner

U.S. Cl. X.R.

260—28, 75, 78.3

UNITED STATES PATENT OFFICE
CERTIFICATE OF CORRECTION

Patent No. 3,534,120     Dated October 13, 1970

Inventor(s) Satoshi Ando, Tetsuo Kinoshita and Takashi Ito

It is certified that error appears in the above-identified patent and that said Letters Patent are hereby corrected as shown below:

Column 10, line 75; "Claim 12" should read ---Claim 5---.
Column 12, line 1; delete "any one of".

SIGNED AND SEALED
DEC 22 1970

(SEAL)
Attest:

Edward M. Fletcher, Jr.
Attesting Officer

WILLIAM E. SCHUYLER, JR.
Commissioner of Patents